US005711379A

United States Patent [19]

Amano et al.

[11] Patent Number: 5,711,379

[45] Date of Patent: Jan. 27, 1998

[54] HAMMER DRILL

[75] Inventors: Kunio Amano; Akihito Hara, both of Anjo, Japan

[73] Assignee: Makita Corporation, Anjo, Japan

[21] Appl. No.: 651,257

[22] Filed: May 23, 1996

[30] Foreign Application Priority Data

May 29, 1995 [JP] Japan .................................... 7-130407

[51] Int. Cl.[6] ........................................ B23B 45/16

[52] U.S. Cl. ............................ 173/48; 173/109; 173/205

[58] Field of Search ............................ 173/48, 104, 109, 173/205

[56] References Cited

U.S. PATENT DOCUMENTS

| | | | |
|---|---|---|---|
| 2,942,852 | 6/1960 | Muthmann | 173/109 |
| 3,834,468 | 9/1974 | Hettich et al. | 173/109 |
| 3,835,715 | 9/1974 | Howell | 173/109 |
| 3,955,628 | 5/1976 | Grozinger et al. | 173/48 |
| 4,098,351 | 7/1978 | Alessio | 173/104 |
| 4,567,950 | 2/1986 | Fushiya et al. | |
| 5,458,206 | 10/1995 | Bourner et al. | 173/104 |

FOREIGN PATENT DOCUMENTS

| | | |
|---|---|---|
| 3505442 A1 | 2/1985 | Germany . |
| 3503921 C2 | 10/1988 | Germany . |
| 4030027 A1 | 3/1992 | Germany . |
| 1584082 | 2/1981 | United Kingdom . |

*Primary Examiner*—Scott A. Smith

*Attorney, Agent, or Firm*—Dennison, Meserole, Pollack & Scheiner

[57] ABSTRACT

A hammer drill includes a spindle supported by a housing and movable in an axial direction relative to the housing within a predetermined range, a motor for rotating the spindle, a rotary cam member fixedly mounted on the spindle, a clutch cam member which supports a weight member is axially movably mounted on the spindle, and a biasing member for normally biasing the clutch cam member and weight member toward the rotary cam member in the axial direction of the spindle. A first cam and a second cam are provided on the rotary cam member and the clutch cam member, respectively, facing each other in the axial direction of the spindle. The first cam and the second cam cause the clutch cam and weight member to repeatedly move toward and away from the rotary cam member as the spindle is rotated causing the spindle to vibrate in the axial direction. The ratio:

$$\frac{\text{weight of clutch cam and weight member}}{\text{biasing member force}}$$

determines the intensity of vibrations transmitted to the hands of an operator.

4 Claims, 6 Drawing Sheets

CONCRETE MATERIAL

| | DRILL DIAMETER | DRILLING ABILITY |
|---|---|---|
| TYPE B | $\phi$6.5 | 125.6 |
| | $\phi$9.5 | 116.0 |
| TYPE C | $\phi$6.5 | 106.5 |
| | $\phi$9.5 | 126.4 |
| TYPE D | $\phi$6.5 | 157.4 |
| | $\phi$9.5 | 92.3 |
| TYPE E | $\phi$6.5 | 119.4 |
| | $\phi$9.5 | 117.8 |

100(TYPE A)

FIG.4(A)

BRICK

| | DRILL DIAMETER | DRILLING ABILITY |
|---|---|---|
| TYPE B | $\phi$6.5 | 105.1 |
| | $\phi$9.5 | 120.6 |
| TYPE C | $\phi$6.5 | 106.5 |
| | $\phi$9.5 | 114.1 |
| TYPE D | $\phi$6.5 | 104.5 |
| | $\phi$9.5 | 118.9 |
| TYPE E | $\phi$6.5 | 108.8 |
| | $\phi$9.5 | 113.0 |

100(TYPE A)

FIG.4(B)

CONCRETE MATERIAL

| | DRILL DIAMETER | DRILLING ABILITY |
|---|---|---|
| TYPE F | ϕ8.0 | 94.7 |
| | ϕ12.5 | 86.7 |
| TYPE G | ϕ8.0 | 98.9 |
| | ϕ12.5 | 117.0 |

100(TYPE H)

FIG.5(A)

BRICK

| | DRILL DIAMETER | DRILLING ABILITY |
|---|---|---|
| TYPE F | ϕ8.0 | 103.2 |
| | ϕ12.5 | 112.2 |
| TYPE G | ϕ8.0 | 124.8 |
| | ϕ12.5 | 147.3 |

100(TYPE H)

FIG.5(B)

| | MAGNITUDE OF VIBRATION(Y AXIS／Z AXIS)m/$s^2$ |
|---|---|
| TYPE A | 1.87／7.50 |
| TYPE D | 0.60／2.01 |
| TYPE H | 2.42／7.80 |
| TYPE I | 1.53／3.78 |
| TYPE J | 1.53／3.78 |
| TYPE K | 1.21／2.27 |
| TYPE L | 1.42／2.41 |

FIG.6

HAMMER DRILL

FIELD OF THE INVENTION

The present invention relates to a hammer drill adapted to drill concrete materials, tiles, bricks, etc.

DESCRIPTION OF THE PRIOR ART

The prior art has proposed various improvements in this kind of hammer drills. For example, U.S. Pat. No. 4,567,950 in the name of the same assignee as the present application discloses a hammer drill in which a clutch cam member is axially movably supported within a housing and in which the clutch cam member is biased by a spring to be pressed on a rotary cam member fixed to a spindle. With a conventional hammer drill proposed prior to this patent, a clutch cam member was fixed to a housing. The system of the patent and the system prior to the patent will be hereinafter called "movable cam system" and "fixed cam system", respectively. With the movable cam system, when an operator, presses the housing of the hammer drill toward a work by a greater force, the clutch cam member may smoothly be retracted (moved away) from the rotary cam member, so that the rotational speed of the spindle may not abruptly be reduced. Therefore, no excessive load is applied to a motor.

On the other hand, with the fixed cam system, since the clutch cam member was fixed to the housing, the vibrations of the clutch cam member and its related parts may be produced independently of the vibrations of the spindle which is essential to generation of the drilling force (axial movement of the spindle) and vibrations of the clutch cam member may be directly transmitted to the hands of the operator. This resulted in an unpleasant operation feeling. On the other hand, with the movable cam system, the vibrations which may be transmitted to the operator can be reduced since the retracting force of the clutch cam member is received by the spring. Therefore, the movable cam system can reduce the vibrations transmitted to the hands of the operator, so that this system can provide an improved operation feeling.

However, with the movable cam system, the clutch cam member is moved axially against the biasing force of the spring applied to the clutch cam member. For this reason, the impact force applicable to the spindle in this system is smaller than the impact force applicable to the spindle in the fixed cam system to some extent, so that the drilling ability of the hammer drill is reduced.

One of the reasons of such a reduced impact force is believed to reside in the conventional construction of the movable cam system which utilizes the clutch cam member having the same size as that used in the fixed cam system. Thus, the fixed cam system was converted into the movable cam system by simply separating the clutch cam member from the spindle and by incorporating the spring for biasing the clutch cam member in the axial direction. Thus, in the fixed cam system, the clutch cam member was designed to have the necessary smallest size from the viewpoint of light weight of the hammer drill. Therefore, the clutch cam member in the movable cam system is lightweight, so that a sufficient impact force cannot be obtained in the movable cam system.

SUMMARY OF THE INVENTION

It is, accordingly, an object of the present invention to provide a hammer drill which can prevent excessive load applied to a motor and which can provide a sufficient impact force.

It is another object of the present invention to provide a hammer drill which has an excellent drilling ability and which can reduce vibrations to be transmitted to the hands of an operator and which can improve the operation feeling.

According to the present invention, there is provided a hammer drill comprising:

- a spindle supported by a housing and movable in an axial direction relative to the housing within a predetermined range;
- a motor for driving the spindle for rotation;
- a rotary cam member fixedly mounted on the spindle;
- a clutch cam and weight member axially movably mounted on the spindle;
- a biasing member for normally biasing the clutch cam and weight member toward the rotary cam member in the axial direction of the spindle; and
- a first cam and a second cam provided on the rotary cam member and the clutch cam member, respectively, and facing each other in the axial direction of the spindle, the first cam and the second cam cooperate with each other so that the clutch cam and weight member repeatedly moves toward and away from the rotary cam member as the spindle rotates, and that the clutch cam member applies vibrations to the spindle in the axial direction;
- the weight of the weight member and the biasing force of the biasing member determining the intensity of the vibrations.

In general, the impact force applied to the spindle increases as the weight of the clutch cam member as well as the biasing force of the biasing member increases. However, when the biasing force is increased, vibrations transmitted to the hands of an operator via the housing are increased. Therefore, with the present invention, the weight of the clutch cam member and the biasing force of the biasing member are determined based on the ratio of the weight member weight relative to the biasing force. Thus, by appropriately selecting the ratio, a sufficient impact force is applied to the spindle while the vibrations to the hands of the operator are reduced.

The invention will become more apparent from the appended claims and the description as it proceeds in connection with the drawings.

BRIEF DESCRIPTION OF THE DRAWINGS

FIG. 4(A) is a graph showing drilling abilities of Types B, C, D and E of hammer drills when they are applied to concrete materials;

FIG. 4(B) is a graph similar to FIG. 4(A) but showing the case where the hammer drills are applied to bricks;

FIG. 5(A) is a graph showing drilling abilities of Types F and G of hammer drills when they are applied to concrete materials;

FIG. 5(B) is a graph similar to FIG. 5(A) but showing the case where the hammer drills are applied to bricks; and FIG. 6 is a table showing the magnitude of vibrations produced in case of Types A, D, H, I, J, K and L of hammer drills.

DETAILED DESCRIPTION OF THE PREFERRED EMBODIMENTS

An embodiment of the present invention will now be explained with reference to the drawings.

Figure 1:
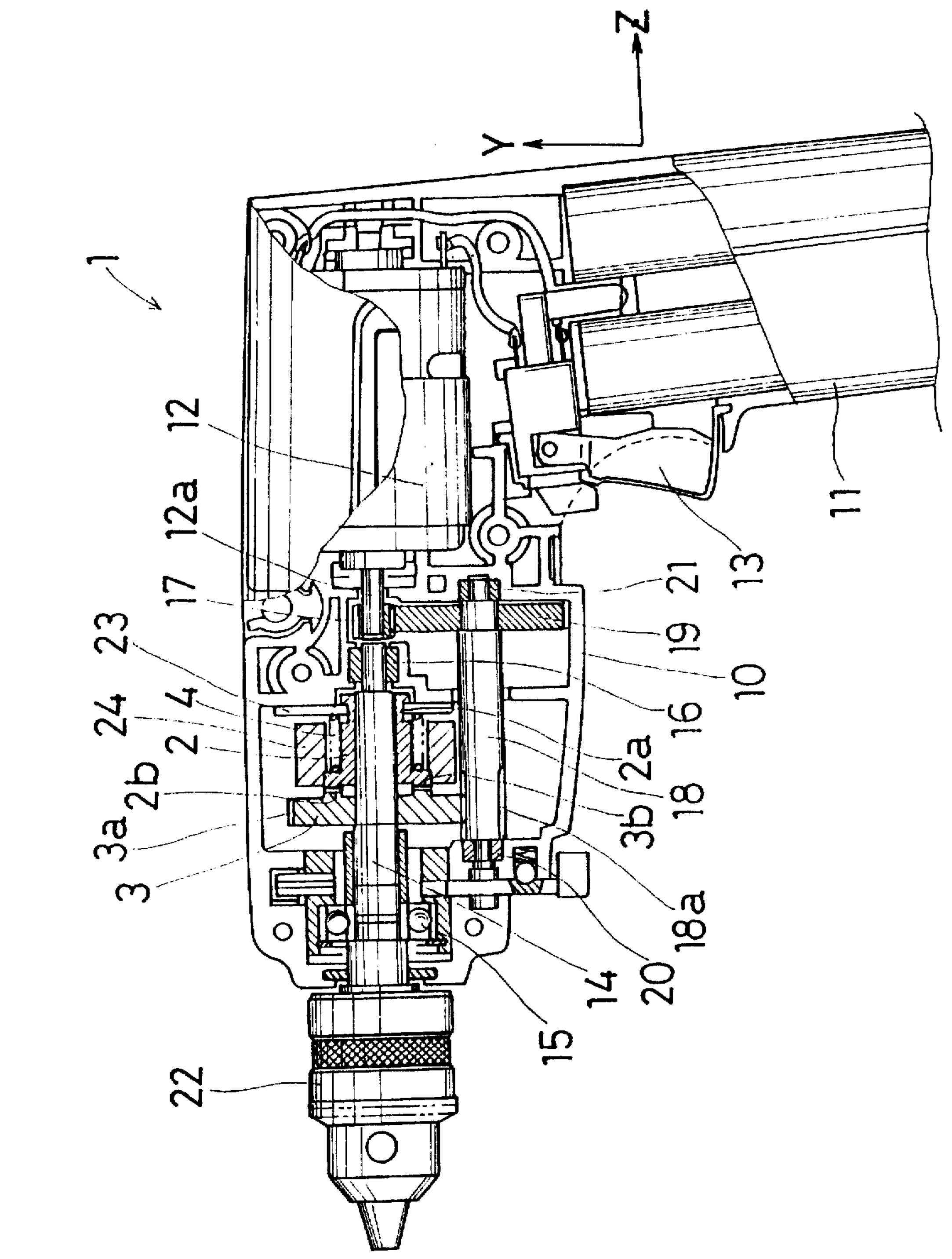
FIG. 1 is a side view, with a part broken away, of a hammer drill according to an embodiment of the present invention.

As shown in FIG. 1, a hammer drill 1 according to this embodiment includes a housing 10 and a handle 11 extending perpendicular from a rear end of the housing 10.

A motor 12 is disposed within a rear portion of the housing 10 and is started and stopped through operation of a trigger switch 13 disposed on the upper portion of the handle 11. The motor 12 has an output shaft 12*a* on which a pinion gear 17 is fixedly mounted.

A spindle 14 is disposed centrally horizontally of the housing 10. The spindle 14 is supported by the housing 10 for rotation and axial movement by means of bearings 15 and 16. The spindle 14 has a front end which extends forwardly from the housing 10 and which has a chuck 22 for mounting a drill bit (not shown). A rotary cam member 3 is fixed to the spindle 14 in a middle position in the axial direction of the spindle 14. A first gear portion 3*a* is formed integrally with a peripheral portion of the rotary cam member 3. The first gear portion 3*a* is in engagement with a second gear portion 18*a* formed on an intermediate shaft 18.

The intermediate shaft 18 extends parallel to the spindle 14 and is rotatably supported in the housing 10 by means of bearings 20 and 21. The second gear portion 18*a* is formed on a front portion of the intermediate shaft 18. The first gear portion 3*a* and the second gear portion 18*a* are in engagement with each other such that they are kept in engagement irrespective of axial movement by a predetermined distance of the first gear portion 3*a* relative to the second gear portion 18*a*. An intermediate gear 19 is fixed to the rear portion of the intermediate shaft 18 and is in engagement with the pinion gear 17 of the motor 12. With this construction, when the motor 12 is started, the rotation of the motor 12 is transmitted to the spindle 14 via the intermediate shaft 18.

Figure 2:
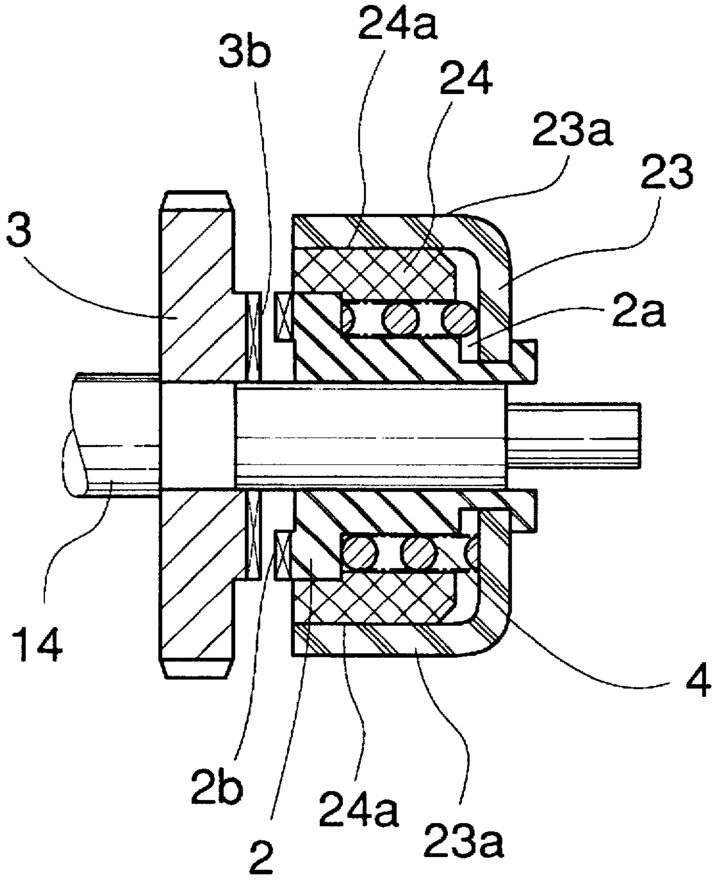
FIG. 2 is a vertical sectional view of the essential parts of the hammer drill.
Figure 3:
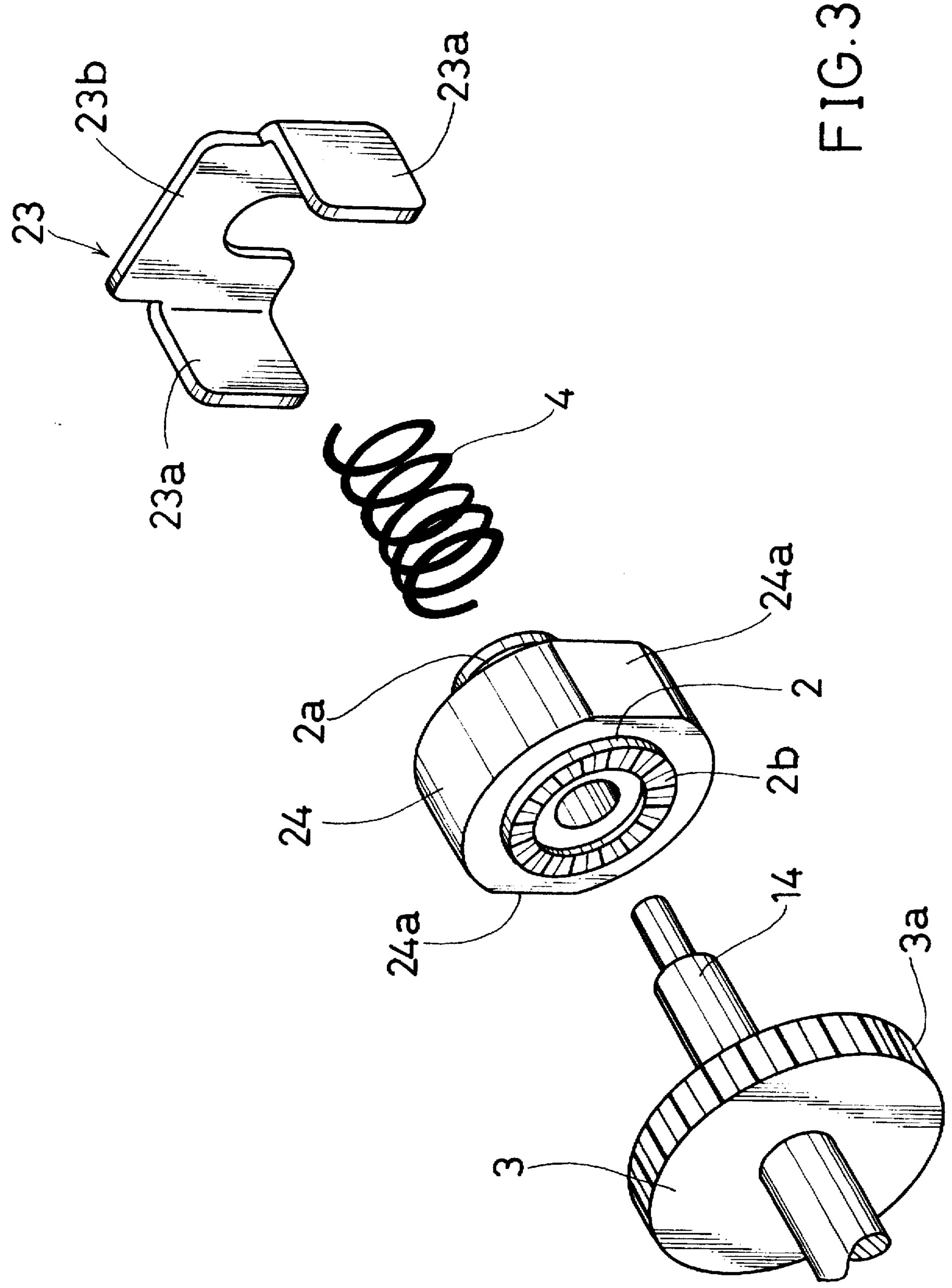
FIG. 3 is an exploded perspective view of the parts shown in FIG. 2.

The rotary cam member 3 has a cam 3*b* formed on the rear surface thereof (the right surface in FIGS. 1 and 2). The cam 3*b* has a plurality of cam teeth (not shown) formed in series in the circumferential direction of the rotary cam member 3. Each of the cam teeth has a saw tooth-like configuration (substantially triangular configuration) and has a predetermined longitudinal length in the radial direction of the rotary cam member 3. A clutch cam member 2 is axially movably fitted on a rear portion of the spindle 14 and has a cam 2*b* formed on the front surface thereof (the left surface in FIGS. 1 and 2). The cam 2*b* has a plurality of cam teeth similar to the cam teeth of the rotary cam member 3. A retainer member 23 has a base portion 23*b* which is in engagement with a circumferential recess 2*a* formed on a rear portion of the clutch cam member 2. The circumferential recess 2*a* has a width in the axial direction of the spindle 14 which is greater than the thickness of the base portion 23*b* of the retainer member 23, so that the clutch cam member 2 can be moved within a predetermined range along the spindle 14 relative to the retainer member 23. As shown in FIGS. 2 and 3, the retainer member 23 has a pair of flat plate-like fingers 23*a* extending forward from the base portion 23*b*. A ring-like weight member 24 is fixedly fitted on the clutch cam member 2. The member 24 has a pair of flat surfaces 24*a* formed on its outer surface, in positions diametrically opposed to each other. The fingers 23*a* of the retainer member 23 contact their corresponding flat surfaces 24*a* of the weight member 24, so that the clutch cam member 2 as well as the weight member 24 is slidably movable relative to the retainer member 23 but is inhibited to rotate about the spindle 14. Thus, the retainer member 23 is fixed in position relative to the housing 10 both in the axial and rotational directions of the spindle 14.

A compression coil spring 4 is interposed between the clutch cam member 2 and the base portion 23*b* of the retainer member 23, so that the clutch cam member 2 is normally biased in a direction for engagement of the cam 2*a* with the cam 3*a* of the rotary cam member 3.

The operation of the above described embodiment will now be explained. When the operator operates the trigger 13 to start the motor 12 with the drill bit mounted on the spindle 14 by the chuck 22, the rotation of the motor 12 is transmitted to the spindle 14 via the intermediate shaft 18, so that the drill bit is rotated. Then, the operator presses the drill bit on a work, so that the work is drilled. On the other hand, as the spindle 14 is rotated, the cam teeth of the cam 3*b* of the rotary cam member 3 abut on the cam teeth of the cam 2*b* of the clutch cam member 2 and then force the cam teeth of the cam 2*b* to move away therefrom by virtue of the cam action, so that the clutch cam member 2 is moved away from the rotary cam member 3 against the biasing force of the spring 4. After the clutch teeth of the clutch cam member 2 has thus passed over the cam teeth of the rotary cam member 3, the clutch cam member 2 is moved to return forwardly by the biasing force of the spring 4 to axially abut on the rotary cam member 3, and the clutch teeth of the rotary cam member 3 abut on the next clutch teeth of the clutch cam member 2. Consequently, the clutch cam member 2 repeatedly abuts axially on the rotary cam member 3 to apply impact forces on the spindle 14 via the rotary cam member 3. Therefore, the drilling operation for the work is performed with the drill bit vibrated in the axial direction.

As described above, with this embodiment, the clutch cam member 2 is loaded by the weight member 24, so that the drill bit as well as the spindle 14 is vibrated with a great kinetic momentum.

The inventor has made various experiments to determine the influence on the driving ability of the weight of the weight member 24 and the biasing force of the spring 4. The following Experiments I, II and III have been conducted with regard to the drilling ability by varying the weight of the weight member 24 and the biasing force of the spring 4:

EXPERIMENT I

FIG. 4 shows the result of Experiment I which has been conducted on the following Types A to E of hammer drills:

| | |
|---|---|
| Type A (hammer drill of the movable cam system referred to in the description of the prior art) | |
| Weight of clutch cam member: | 25.6 g |
| Force of spring: | 11.2 kg |
| Type B (hammer drill of the present invention) | |
| Weight of clutch cam member: | 78.2 g |
| Force of spring: | 19.67 kg |
| Type C (hammer drill of the present invention) | |
| Weight of clutch cam member: | 78.2 g |
| Force of spring: | 11.2 kg |
| Type D (hammer drill of the present invention) | |
| Weight of clutch cam member: | 78.2 g |
| Force of spring: | 5.83 kg |
| Type E (hammer drill of the fixed cam system referred to in the description of the prior art) | |

Here, the term "Weight of clutch cam member" in Types B to D means the sum of the weight of the clutch member 2 and the weight of the weight member 24. The hammer drills used in this experiment are those having motors driven by a DC power source.

The experiment has been performed by measuring the drilling depth of the drill bit into a concrete material (FIG. 4 (A)) and a brick (FIG. 4(B)). Two types of drill bits having a diameter of 6.5 mm and a diameter of 9.5 mm have been used in this experiment, and the drilling operation has been performed for 15 seconds for the drill bit of 6.5 mm and 30 seconds for the drill bit of 9.5 mm. The drilling depth or the drilling ability has been indicated by values compared with the driving depth obtained in connection with Type A which is represented as 100.

As will be seen from the result of this experiment, the driving abilities of Types B to E are much better than the driving ability of Type A except the case where Type D has been operated using the drill bit of 9.5 mm. Additionally, it will also be seen that the weight of the clutch cam member has a great influence on the drilling ability and that the drilling ability much better as the weight of the clutch cam member increases. Further, the drilling abilities of Types B, C and D are not always inferior to the drilling ability of Type E but are substantially equal to the latter. In some cases, the drilling abilities of Types B, C and D are much better than the drilling ability of Type E. These are true of both the cases of the concrete material and the brick.

EXPERIMENT II

The experiment II has been conducted for the following Types F, G and H of hammer drills having motors driven by an AC power source:

| | |
|---|---|
| Type F | |
| Weight of clutch cam member | 235.2 g |
| Force of spring | 12.63 kg |
| Type G | |
| Weight of clutch cam member | 234.4 g |
| Force of spring | 22.95 kg |
| Type H (hammer drill of the fixed cam system) | |

Experiment II has been performed by measuring the drilling depth of the drill bit into the concrete material (FIG. 5 (A)) and the brick (FIG. 5(B)). Two types of drill bits having a diameter of 8.0 mm and a diameter of 12.5 mm have been used in this experiment. The drilling depth or the drilling ability is indicated by values compared with the driving depth obtained for Type H which is represented as 100.

As will also be seen from the result of this experiment, the drilling ability equal to or more excellent than the drilling ability of the conventional fixed type hammer drill can be obtained by increasing the weight of the clutch cam member in comparison with the weight (25.6 g) of the clutch cam member of the movable cam system. Additionally, in general, the drilling ability becomes better as the force of the spring increases.

However, from the viewpoint of vibrations which may be transmitted the hands of the operator, it is not preferable to increase the force of the spring without limitation. For this reason, Experiment III has been conducted for the following types of hammer drills including Types A, D and H described above:

| | |
|---|---|
| Type A (hammer drill of movable cam system) | |
| Weight of clutch cam member | 25.6 g |
| Force of spring | 11.2 kg |
| Type D | |
| Weight of clutch cam member | 78.2 g |
| Force of spring | 5.83 kg |
| Type H (hammer drill of fixed cam system) | |
| Type I | |
| Weight of clutch cam member | 144.0 g |
| Force of spring | 12.63 kg |
| Type J | |
| Weight of clutch cam member | 234.4 g |
| Force of spring | 12.63 kg |
| Type K | |
| Weight of clutch cam member | 144.0 g |
| Force of spring | 22.95 kg |
| Type L | |
| Weight of clutch cam member | 234.4 g |
| Force of spring | 22.95 kg |

The result of Experiment III is shown in FIG. 6. This experiment has been conducted according to CE Standards (European Community Standards). In FIG. 6, Y axis and Z axis correspond to Y direction and Z direction indicated by arrows in FIG. 1, respectively.

As will be seen from FIG. 6, the vibrations transmitted to the hands of the operator are great in case of Types A and H and are small in case of other types. This means that the vibrations generally increase as the force of the spring increases relative to the weight of the clutch cam member. In view of this fact, a ratio μ of weight of clutch cam member to force of spring has been calculated for each type as follows:

| | |
|---|---|
| Type A | $\mu(A) = 25.6/11.2 = 2.29$ |
| Type D | $\mu(D) = 78.2/5.83 = 13.41$ |
| Type H | $\mu(H) \cong 0$ |
| Type I | $\mu(I) = 144.0/12.63 = 11.40$ |
| Type J | $\mu(J) = 234.4/12.63 = 18.56$ |
| Type K | $\mu(K) = 144.0/22.95 = 6.27$ |
| Type L | $\mu(L) = 234.4/22.95 = 10.21$ |

As the result, the vibrations transmitted to the hands of the operator are great when the ratio μ is 3 or less while the vibrations are small when the ratio μ is 6 or more. For this reason, the force of the spring must be determined in view of the weight of the clutch cam member. Thus, the combination of an increase in the weight of the clutch cam member to obtain a greater impact force and decrease in the force of the spring is advantageous to obtain both the improvements in the drilling ability and the reduction of vibrations transmitted to hands of the operator.

From the viewpoint of obtaining both the improvements in the drilling ability and the reduction of the vibrations, a most preferable result has been obtained in case of Type D (driven by the DC power source). Thus, by determining the weight of clutch cam member to be substantially three times (25.6 g→78.2 g) as the weight of the clutch cam member of the conventional movable cam system and by determining the force of spring to be substantially half (11.2 Kg→5.83 kg) the force of a spring of the conventional movable cam system, substantially the same drilling ability as the conventional fixed cam system can be obtained while the vibrations transmitted to the hands of the operator can be considerably reduced (7.50 $m/s^2 \rightarrow 2.01\ m/s^2$) as shown in FIG. 6.

As described above, with this embodiment, since the weight of the clutch cam member 2 is increased by the weight member 24, the driving ability of the hammer drill 1 is much better than the driving ability of the conventional movable cam system incorporating the clutch cam member having the same weight, and may be equal to or much better than the driving ability of the conventional fixed cam system, while no excessive load may be applied to the motor 12.

Although in the above embodiment, the weight member 24 is manufactured separately of the clutch cam member 2, the weight member 24 may be formed integrally with the clutch cam member 2. In addition, the spring 4 in the form of the compression coil spring may be replaced by other biasing member such as a belleville spring, a resilient rubber or an air damper.

While the invention has been described with reference to a preferred embodiment thereof, it is to be understood that modifications or variations may be easily made without departing from the spirit of this invention which is defined by the appended claims.

What is claimed is:

1. A hammer drill comprising:

a housing;

a spindle supported by bearings mounted in the housing, said spindle movable in an axial direction relative to the housing within a predetermined range;

a rotatable cam member fixedly mounted on the spindle;

means for rotating said rotary cam member together with said spindle;

cylindrical means mounted on said spindle and being movable in the axial direction relative to the spindle;

means for preventing rotational movement of said cylindrical means;

means for normally biasing said cylindrical means toward said rotary cam member in the axial direction of the spindle;

said cylindrical means including a clutch member and a weight member substantially configured as a cylinder with a first and a second flat outer surface at diametrically opposed positions;

said means for preventing rotational movement having the configuration of a U-shaped bracket fixed relative to the housing, said bracket having a first and a second flat surface configured to slidably contact the first and the second outer surfaces;

a first cam provided on said rotatable cam member, a second cam provided on said clutch member, the cams facing each other in the axial direction of the spindle and cooperating with each other so that in response to spindle rotation, said cylindrical means repeatedly moves toward and away from the rotating cam member, whereby the cylindrical means applies vibrations to the spindle in the axial direction, the impacting force of the vibrations improving the performance.

2. The hammer drill according to claim 1 wherein the intensity of the vibrations transmitted to the hands of an operator is a function of the ratio:

$$\mu = \frac{\text{weight of clutch cam and weight member}}{\text{biasing member force}}.$$

3. The hammer drill according to claim 2, wherein the ration μ is at least 6.

4. The hammer drill according to claim 1, wherein the weight member is a cylindrical body formed with an inner opening for fixing to the clutch member.

* * * * *